US011689266B2

(12) United States Patent
Takeda et al.

(10) Patent No.: US 11,689,266 B2
(45) Date of Patent: Jun. 27, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Chongning Na, Beijing (CN); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 78 days.

(21) Appl. No.: 16/757,897

(22) PCT Filed: Oct. 23, 2017

(86) PCT No.: PCT/JP2017/038209
§ 371 (c)(1),
(2) Date: Apr. 21, 2020

(87) PCT Pub. No.: WO2019/082244
PCT Pub. Date: May 2, 2019

(65) Prior Publication Data
US 2020/0343954 A1    Oct. 29, 2020

(51) Int. Cl.
*H04B 7/06* (2006.01)
*H04W 76/11* (2018.01)
*H04W 24/10* (2009.01)
*H04W 72/21* (2023.01)
*H04W 72/23* (2023.01)

(52) U.S. Cl.
CPC .......... *H04B 7/0626* (2013.01); *H04W 24/10* (2013.01); *H04W 72/21* (2023.01); *H04W 72/23* (2023.01); *H04W 76/11* (2018.02)

(58) Field of Classification Search
CPC ... H04B 7/0626; H04B 7/0643; H04W 24/10; H04W 72/0413; H04W 72/042; H04W 76/11; H04W 72/04
See application file for complete search history.

(56) References Cited

U.S. PATENT DOCUMENTS

2017/0359745 A1* 12/2017 Lee .................. H04W 24/10
2018/0167931 A1*  6/2018 Papasakellariou .... H04L 1/1854
(Continued)

FOREIGN PATENT DOCUMENTS

WO    2016/093618 A1    6/2016
WO    2018106063 A1     6/2018

OTHER PUBLICATIONS

Extended European Search Report issued in counterpart European Patent Application No. 17929592.8, dated May 26, 2021 (10 pages).
(Continued)

*Primary Examiner* — John D Blanton
(74) *Attorney, Agent, or Firm* — Osha Bergman Watanabe & Burton LLP

(57) ABSTRACT

To appropriately control CSI reporting even in a case of performing CSI reporting by employing a method different from ones for existing LTE systems, one aspect of a user terminal of the present invention includes a transmitting section that transmits channel state information, and a control section that controls transmission of the channel state information by using certain downlink control information indicating trigger and/or activation of channel state information without scheduling data.

9 Claims, 15 Drawing Sheets

(56) References Cited

U.S. PATENT DOCUMENTS

| | | | |
|---|---|---|---|
| 2018/0175983 A1* | 6/2018 | Yum | H04L 5/0053 |
| 2019/0082431 A1* | 3/2019 | Yi | H04L 5/0053 |
| 2020/0187170 A1* | 6/2020 | Shin | H04J 11/0069 |

OTHER PUBLICATIONS

ZTE; "Issues on UCI transmission on PUSCH in LTE-Advanced"; 3GPP TSG RAN WG1 Meeting #62, R1-104673; Madrid, Spain; Aug. 23-27, 2010 (3 pages).

International Search Report issued in PCT/JP2017/038209 dated Dec. 26, 2017 (2 pages).

Written Opinion of the International Searching Authority issued in PCT/JP2017/038209 dated Dec. 26, 2017 (5 pages).

Ericsson et al.; "WF for remaining details on aperiodic CSI on PUCCH"; 3GPP TSG-RAN WG1#90bis, R1-1718870 Prague, Czech Republic; Oct. 9-13, 2017 (3 pages).

LG Electronics; "Discussions on CSI reporting"; 3GPP TSG RAN WG1 Meeting #90bis, R1-1717940; Prague, Czech Republic; Oct. 9-13, 2017 (8 pages).

Ericsson; "Offline session notes CSI reporting (AI 7.2.2.2)"; 3GPP TSG RAN WG1 Meeting #90bis, R1-1719142; Prague, CZ; Oct. 9-13, 2017 (6 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in the counterpart Japanese Patent Application No. 2019-549692, dated Oct. 12, 2021 (7 pages).

Office Action issued in Indian Application No. 202037020244 dated Apr. 29, 2022 (9 pages).

Office Action issued in Australian Application No. 2017436825; dated Oct. 11, 2022 (3 pages).

* cited by examiner

DCI FOR SCHEDULING DATA
(WITHOUT CSI TRIGGER FIELD)

- DCI FOR SCHEDULING PDSCH
- DCI FOR SCHEDULING PUSCH

DCI FOR TRIGGERING CSI
(WITHOUT DATA SCHEDULING)

- DCI FOR TRIGGERING A-CSI REPORTING USING PUCCH
- DCI FOR TRIGGERING A-CSI REPORTING USING PUSCH

FIG. 3

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of achieving further broadbandization and increased speed beyond LTE (also referred to as "LTE Rel. 8" or "LTE Rel. 9"), the specifications of LTE-A (also referred to as "LTE advanced," "LTE Rel. 10, "LTE Rel. 11," or "LTE Rel. 12") have been drafted, and successor systems of LTE (referred to as, for example, "FRA (Future Radio Access)," "5G (5th generation mobile communication system)," "5G+(plus)," "NR (New Radio)," "NX (New radio access)," "FX (Future generation radio access)," "LTE Rel. 13," "LTE Rel. 14," "LTE Rel. 15 (or later versions)," and so on) are also under study.

In existing LTE systems (for example, LTE Rel. 8 to Rel. 13), a UE maps an uplink signal to appropriate radio resources and transmits the uplink signal to an eNB. Uplink user data is transmitted on an uplink shared channel (PUSCH (Physical Uplink Shared Channel)). Uplink control information (UCI) is transmitted on the PUSCH when being transmitted together with the uplink user data, and is transmitted on an uplink control channel (PUCCH (Physical Uplink Control Channel)) when being transmitted individually.

UCI includes acknowledge information (ACK/NACK), a scheduling request, channel state information (CSI), and so on related to a downlink shared channel (PDSCH (Physical Downlink Shared Channel)). Acknowledge information may be referred to as "HARQ-ACK (Hybrid Automatic Repeat reQuest-Acknowledgement), "ACK/NACK (A/N), "retransmission control information, and the like.

CSI is information based on an instantaneous downlink channel state, for example, a channel quality indicator (CQI), a precoding matrix indicator (PMI), a precoding Type Indicator (PTI), a rank indicator (RI), and the like. CSI is reported by the UE to the eNB periodically or aperiodically.

In a case of periodic CSI (P-CSI), the UE periodically transmits CSI, based on a period and/or resource reported by a radio base station. In a case of aperiodic CSI (A-CSI) on the other hand, the UE transmits CSI in response to a CSI reporting request (also referred to as a "trigger, a "CSI trigger, a "CSI request, and the like) from a radio base station.

The CSI trigger is included in an uplink scheduling grant (also referred to as a "UL (Uplink) grant below) transmitted on a downlink control channel (a PDCCH (Physical Downlink Control Channel)). The UE reports A-CSI in accordance with CSI trigger included in a UL grant scheduling uplink data, on a PUSCH specified by the UL grant. Such reporting is also referred to as "A-CSI reporting.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, LTE Rel. 14, LTE Rel. 15 (or later versions), 5G, NR, and the like), it is also studied to control CSI reporting in a configuration different from ones for existing LTE systems (for example, LTE Rel. 13 (or previous versions)).

For example, it is studied to perform aperiodic CSI reporting on not only an uplink shared channel but also an uplink control channel. In this case, the problem is how to control allocation of an uplink control channel to which aperiodic CSI is allocated.

For example, it is conceivable to employ control similar to control for CSI reporting of existing systems. However, in existing systems, trigger of A-CSI reporting is controlled by using a PUSCH specified by a UL grant for scheduling uplink data, and it is not assumed to specify a resource for an uplink control channel by the UL grant. In a case of performing CSI reporting by employing a method different from those for the existing LTE systems as described above, it is difficult to employ any of CSI reporting control methods for the existing LTE systems without any modification.

The present invention has been made in view of the above respects, and an object of the present invention is to provide a user terminal and a radio communication method which make possible to appropriately control CSI reporting even in a case of performing CSI reporting by employing a method different from ones for existing LTE systems.

Solution to Problem

A user terminal according to one aspect of the present invention includes a transmitting section that transmits channel state information, and a control section that controls transmission of the channel state information by using certain downlink control information indicating trigger and/or activation of channel state information without scheduling data.

Advantageous Effects of Invention

According to the present invention, it is possible to appropriately control CSI reporting even in a case of performing CSI reporting by employing a method different from ones for existing LTE systems.

BRIEF DESCRIPTION OF DRAWINGS

FIG. 3 is a diagram to show an example of DCI that triggers A-CSI;

DESCRIPTION OF EMBODIMENTS

In existing LTE systems (Rel. 10 to Rel. 13), a reference signal for measuring a channel state in the downlink is defined. Such a reference signal for channel state measurement is also referred to as a "CRS (Cell-specific Reference Signal)" and a "CSI-RS (Channel State Information-Reference Signal)" and is a reference signal that is used for measurement of CSI such as a CQI (Channel Quality Indicator), a PMI (Precoding Matrix Indicator), and an RI (Rank Indicator), as a channel state.

A user terminal (UE) feeds back, as channel state information (CSI), a result of measurement performed based on the reference signal for channel state measurement, to a radio base station at a certain timing. As a CSI feedback method, periodic CSI reporting (P-CSI) and aperiodic CSI reporting (A-CSI) are defined.

In a case of performing aperiodic CSI reporting, the UE transmits A-CSI in response to CSI trigger (CSI request) from the radio base station. For example, the UE performs A-CSI at a certain timing (for example, four subframes) after receiving the CSI trigger.

Figure 1:
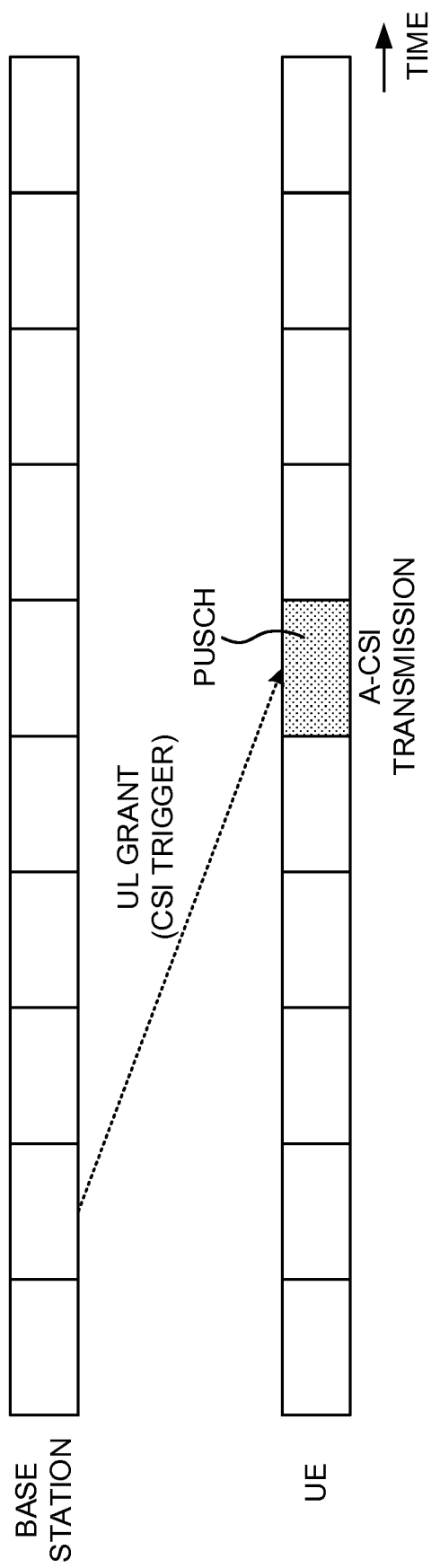
FIG. 1 is a diagram to show an example of transmission of A-CSI for existing systems.

The CSI trigger reported by the radio base station is included in downlink control information (for example, DCI format 0/4) for an uplink scheduling grant (UL grant) transmitted on a downlink control channel. The UE performs A-CSI transmission by using a PUSCH specified by the UL grant, in accordance with a trigger included in the downlink control information for a UL grant for scheduling UL data (refer to FIG. 1). In a case of performing CA, the user terminal can receive a UL grant (including an A-CSI trigger) for a certain cell, on a downlink control channel for another cell.

Figure 2:
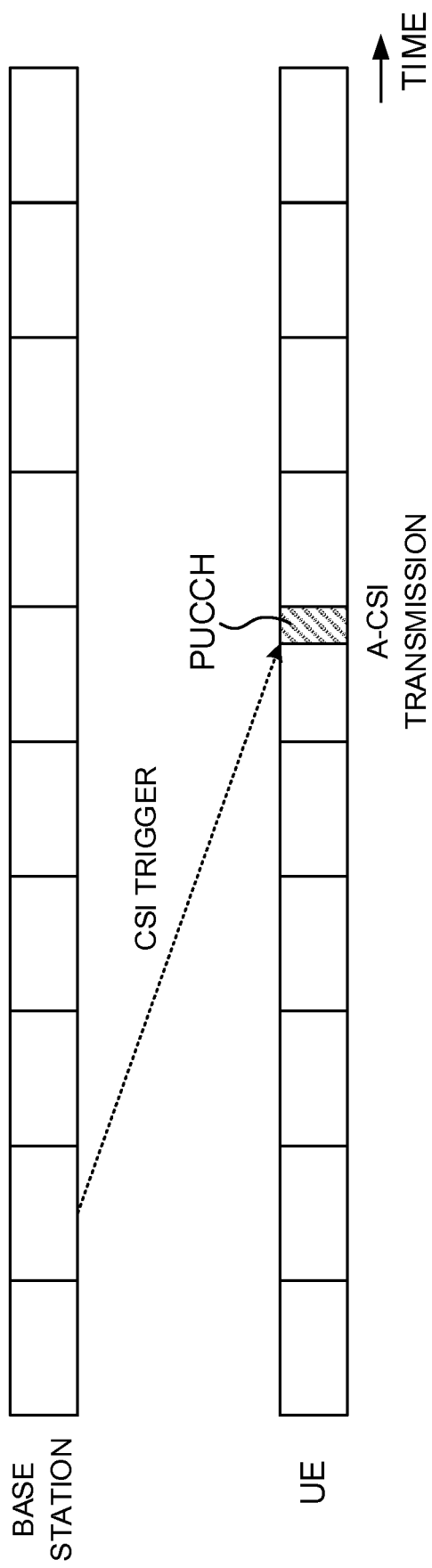
FIG. 2 is a diagram to show an example of A-CSI using a PUCCH.

For future radio communication systems (also referred to as "5G/NR"), it is studied to perform CSI reporting in a configuration different from ones for existing LTE systems. For example, it is studied to perform A-CSI reporting by using not only a PUSCH but also a PUCCH (refer to FIG. 2). FIG. 2 shows a case of transmitting A-CSI by using a short PUCCH and/or a long PUCCH, based on an indication (CSI trigger) from the base station.

The short PUCCH corresponds to a UL control channel that can use a short duration compared to that of a PUCCH format for existing LTE systems (for example, LTE Rel. 8 to Rel. 13). The long PUCCH corresponds to a UL control channel of a long duration compared to the short duration of the short PUCCH. The short PUCCH includes a certain number of symbols (for example, one, two, or three symbols) in a certain subcarrier spacing (SCS, sub-carrier spacing). In the short PUCCH, uplink control information and a reference signal may be multiplexed in time division multiplexing (TDM) or may be multiplexed in frequency division multiplexing (FDM). The RS may be, for example, a demodulation reference signal (DMRS) to be used for demodulation of UCI. The short PUCCH may be configured in at least one symbol in each slot.

In contrast, the long PUCCH is mapped to a plurality of symbols in a slot, to have a greater coverage and/or communicate more pieces of UCI than those of the short PUCCH. For example, the long PUCCH may be configured by using seven symbols or 14 symbols. In the long PUCCH, UCI and an RS (for example, a DMRS) may be multiplexed in TDM or may be multiplexed in FDM. In the long PUCCH, frequency hopping may be performed for each certain period (for example, each mini (sub) slot) in the slot. In a case of performing intra-slot frequency hopping, a DMRS of one or two symbols is preferably mapped in every single hop.

The long PUCCH may be constituted of an equal number of frequency resources to that of the short PUCCH or may be constituted of a smaller number of frequency resources (for example, one or two physical resource blocks (PRBs)) than that of the short PUCCH, to obtain power amplification effects. The long PUCCH may be mapped to the same slot as that for the short PUCCH.

Note that, in a case that a plurality of PUCCH formats are supported, it may be configured so that the short PUCCH corresponds to certain PUCCH formats (for example, PUCCH formats 0 and 2), and the long PUCCH corresponds to the other PUCCH formats (for example, PUCCH formats 1, 3, and 4).

By allowing (supporting) A-CSI using a PUCCH as described above, it is possible to control CSI reporting more flexibly and also increase A-CSI transmission/reception quality. However, in existing systems, A-CSI reporting is controlled by using a PUSCH specified by a UL grant scheduling uplink data, and it is not assumed to specify any PUCCH resource by the UL grant.

Hence, the problem in a case of performing A-CSI reporting by using a PUCCH is how to control PUCCH allocation (for example, reporting of a PUCCH resource and the like) for allocating A-CSI.

Moreover, in existing systems, it is configured to include a bit field indicating trigger of channel state information, in downlink control information for scheduling data. With this configuration, it is necessary, in a case of performing CSI trigger, to use the downlink control information for scheduling data, and hence it is not possible to flexibly configure CSI trigger independently of data scheduling.

The inventors of the present invention focused on the respect that a DL signal (for example, downlink control information) other than a UL grant can be used for reporting of CSI trigger and came up with the idea of controlling CSI trigger (CSI reporting) by using downlink control information not scheduling data.

Moreover, the inventors of the present invention came up with the idea of controlling CSI trigger (CSI reporting) by using downlink control information including a CSI trigger field in DCI for scheduling UL data and/or DL data, in addition to downlink control information not scheduling data.

Embodiments according to the present invention will be described in detail below with reference to the drawings. A configuration according to each aspect to be carried out may be employed independently or may be employed in combination. Although an aperiodic CSI (A-CSI) trigger will be described in the following description, the present embodiment is not limited thereto. For example, the present embodiment can be employed for reporting of activation and/or deactivation of CSI (for example, semi-persistent CSI). In this case, "CSI trigger" only needs to be replaced with "reporting of CSI (for example, SP-CSI) activation and/or deactivation."

Note that SP-CSI indicates a case where CSI reporting is performed semi-persistently (SP-CSI (Semi-persistent CSI)). In SP-CSI reporting, at least one of wide band, partial band, and subband is used as a frequency granularity, a long PUCCH and/or PUSCH is used as a physical channel, and Type 1 CSI and/or partial Type 2 CSI is used as codebook. In a case of performing CSI reporting semi-persistently, such configurations can be made (for example, activated/deactivated) in the UE by using downlink control information and/or MAC control information (MAC CE).

(First Aspect)

In a first aspect, certain downlink control information (also referred to as "CSI trigger DCI" below) indicating CSI trigger without scheduling data is configured. CSI trigger DCI and DCI for scheduling data (also referred to as "data scheduling DCI" below) will be described below.

<Configuration 1>

For example, CSI trigger DCI that triggers CSI reporting using a PUCCH and/or a PUSCH and data scheduling DCI for scheduling data (for example, a PDSCH and/or a PUSCH) are configured.

In this case, the UE performs receiving processes by assuming that there is a possibility that any of DCI for scheduling DL data (for example, a PDSCH), DCI for scheduling UL data (for example, a PUSCH), DCI that triggers CSI reporting using a PUCCH, and DCI that triggers CSI reporting using a PUSCH will be transmitted (refer to FIG. 3).

The UE may control receiving processes by assuming that the CSI trigger field is included in neither DCI for scheduling DL data nor DCI for scheduling UL data. The UE may control receiving processes by assuming that data scheduling information is included in neither DCI that triggers CSI reporting using a PUCCH nor DCI that triggers CSI reporting using a PUSCH.

When the UE receives DCI that triggers CSI reporting using a PUCCH, the UE only needs to feed back CSI by using a resource (for example, a PUCCH resource) specified based on the DCI. When the UE receives DCI that triggers CSI reporting using a PUSCH, the UE only needs to feed back CSI by using a resource (for example, a PUSCH resource) specified based on the DCI.

By thus configuring certain DCI indicating CSI trigger without scheduling data, it is possible to indicate the CSI trigger to the UE independently of data scheduling. In this way, the timing of CSI reporting and/or a resource to be used for CSI reporting, and the like can be flexibly controlled. By including information related to a PUCCH resource in CSI trigger DCI, it is possible to appropriately perform CSI reporting using the PUCCH resource.

Note that, for a user terminal that performs carrier aggregation, in Configuration 1, CSI trigger DCI that triggers CSI reporting using a PUCCH and/or a PUSCH may be DCI that is of a certain carrier and that can trigger CSI reporting using a PUCCH and/or a PUSCH of another carrier. For example, the DCI may include a Carrier-indication field (CIF) of a several bits (for example, three bits) and indicate the PUCCH and/or the PUSCH of which carrier (CC) is to be used for transmission of CSI reporting, according to the CIF value.

<Configuration 2>

Figure 4:
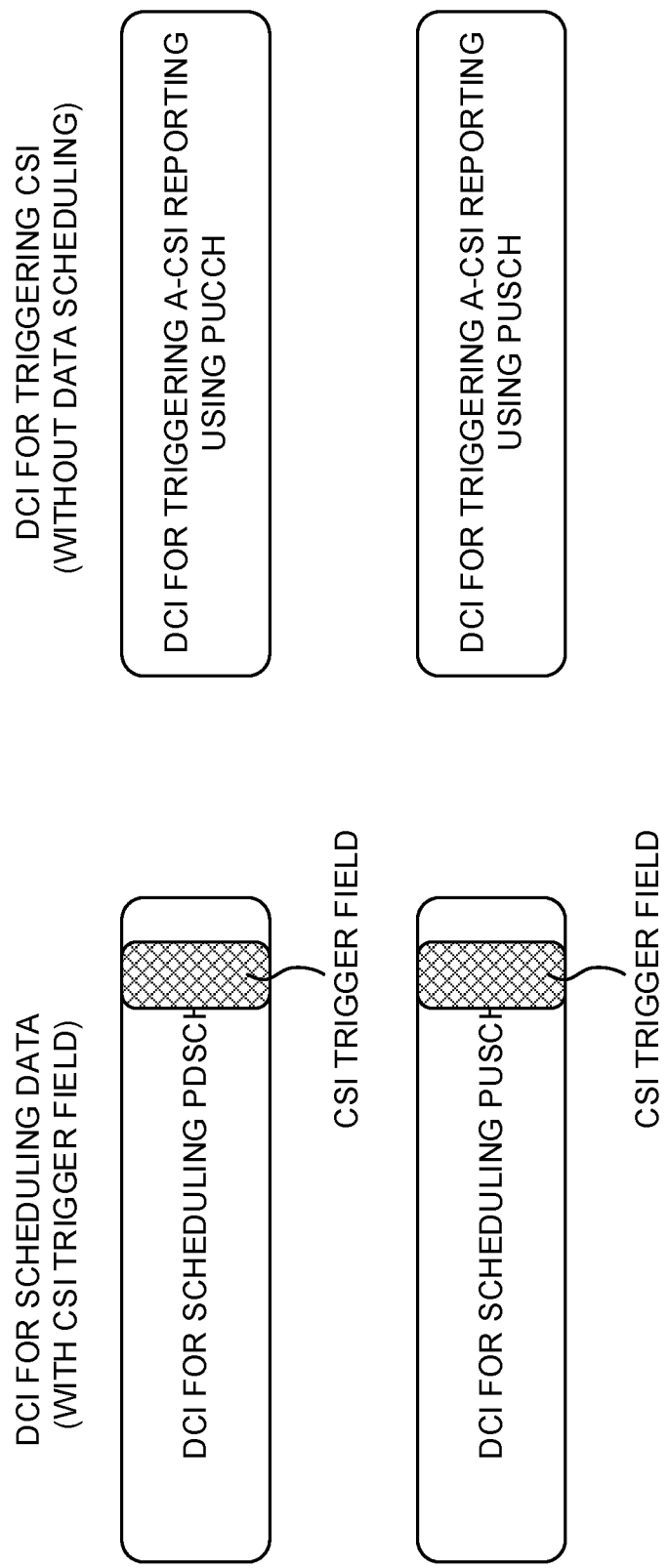
FIG. 4 is a diagram to show another example of DCI that triggers A-CSI.

It may be configured that a field indicating CSI trigger is included in data scheduling DCI for scheduling data (for example, a PDSCH and/or a PUSCH) (refer to FIG. 4).

In this case, the UE assumes that the CSI trigger field is included in DCI for scheduling DL data and DCI for scheduling UL data. The UE assumes that data scheduling information is included in neither DCI that triggers CSI reporting using a PUCCH nor DCI that triggers CSI reporting using a PUSCH.

When the CSI trigger field is included in DCI for scheduling DL data, the UE only needs to feed back CSI by using a resource (for example, a PUCCH resource) specified based on the DCI. The PUCCH resource may be in common with a resource to be used for A/N for DL data or may be configured separately. When the CSI trigger field is included in DCI for scheduling UL data, the UE only needs to feed back CSI by using a resource (for example, a PUSCH resource) specified based on the DCI.

In Configuration 2, when the timing of CSI trigger and the timing for indicating scheduling of UL data and/or DL data overlap, it is possible to report to the UE data scheduling DCI by including indication of the CSI trigger therein. In contrast, when there is no need to schedule UL data and/or DL data at the time of performing CSI trigger, the CSI trigger may be indicated to the UE by using CSI trigger DCI. In this way, it is possible to flexibly control CSI reporting depending on the state of scheduling.

(Second Aspect)

In a second aspect, a description will be given of a case where the UE distinguishes (or discriminates) between CSI trigger DCI that indicates CSI trigger without scheduling data and DCI for scheduling data, based on certain conditions. Examples of the certain conditions include a configuration of providing an identification field in DCI, a configuration of differentiating the pieces of DCI in payload size, a configuration of differentiating the pieces of DCI in DCI detection condition, a configuration of using a bit value of a certain bit field, and the like.

The certain conditions will be described below. The certain conditions to be described below may be used independently, or some of or all of the certain conditions may be used in combination. Note that, in the following description, CSI trigger DCI can be used for CSI reporting using a PUCCH and CSI reporting using a PUSCH. Data scheduling DCI for scheduling data (for example, a PDSCH and/or a PUSCH) can be used for both a configuration including the A-CSI field for triggering CSI and a configuration not including the A-CSI field.

<Identification Field>

Figure 5:
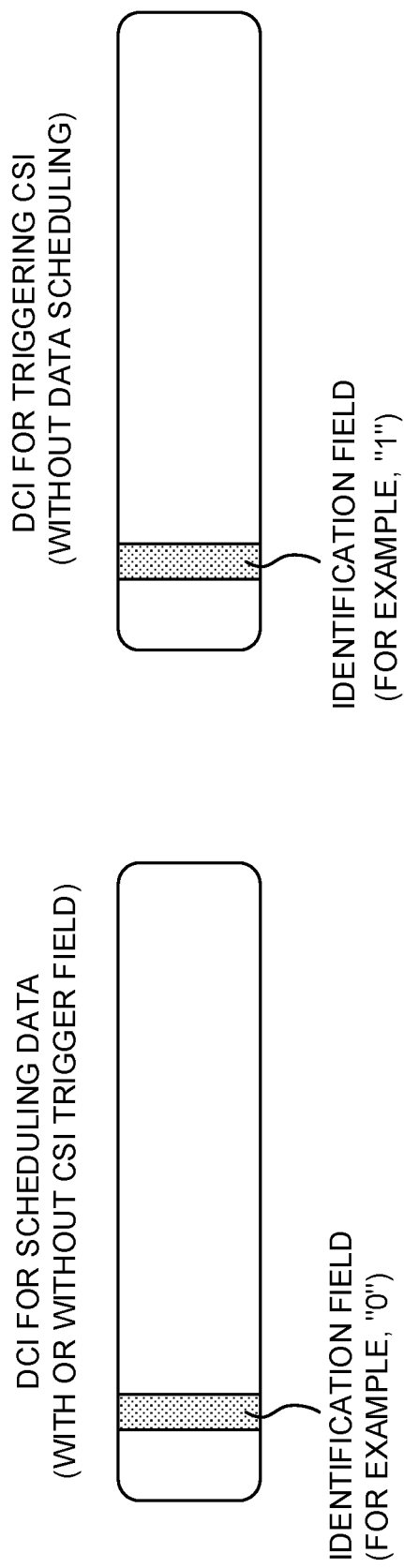
FIG. 5 is a diagram to show an example of CSI trigger DCI and data scheduling DCI.

An identification field for identifying the type of each DCI is provided for each of CSI trigger DCI and data scheduling DCI (refer to FIG. 5). The UE determines whether received DCI is CSI trigger DCI or data scheduling DCI, based on bit information in the identification field included in DCI.

For example, in FIG. 5, the identification field is configured using one bit, and the DCI corresponds to data scheduling DCI when the bit value of the identification field is "0," while the DCI corresponds to CSI trigger DCI when the bit value is "1." Note that the identification field is not limited to one bit and may be provided using two or more bits.

In this case, the DCI format size (payload size) of CSI trigger DCI may be configured to have the same DCI format size as that of the data scheduling DCI. In this way, the same error correcting code (for example, a polar code) can be used for the pieces of DCI. Consequently, it is possible to simplify processing of transmitting/receiving processes and to thereby suppress an increase in processing load.

An RNTI to be used for a CRC mask for CSI trigger DCI and an RNTI to be used for a CRC mask for data scheduling DCI may be the same. In this way, it is possible to use the same RNTI for the pieces of DCI and to thereby suppress an increase in load of the transmitting/receiving processes.

It may be configured that one of a search space for CSI trigger DCI and a search space for data scheduling DCI includes the other. For example, it may be configured that the search space for the CSI trigger DCI is the same as the search space for the data scheduling DCI. It may be configured that the search space for the CSI trigger DCI is a subset or a superset of the search space for the data scheduling DCI.

By thus employing such a configuration that one of the search space for the CSI trigger DCI and the search space for the data scheduling DCI includes the other, it is possible to configure downlink control channel candidates (PDCCH candidates) in common for the pieces of DCI. In this way, it is possible to prevent an increase of a range to be monitored (detected) by the UE at the time of receiving the pieces of DCI. Consequently, it is possible to suppress an increase in the number of times of blind decoding even when CSI trigger DCI is provided separately from data scheduling DCI.

<Payload Size>

Figure 6:
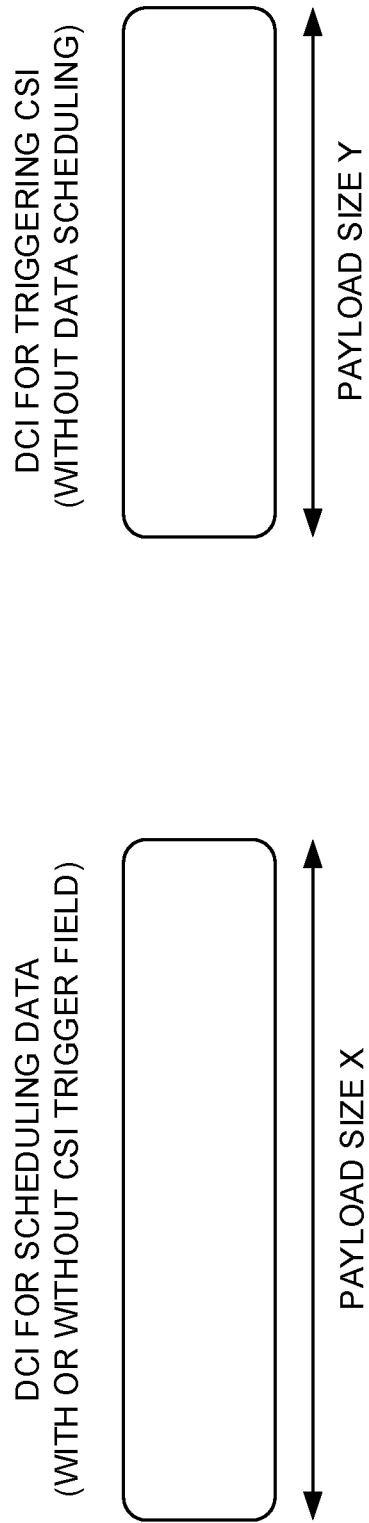
FIG. 6 is a diagram to show another example of CSI trigger DCI and data scheduling DCI.

The DCI format size (payload size) of CSI trigger DCI is configured to have the different DCI format size of the data scheduling DCI (refer to FIG. 6). The UE determines whether received DCI is CSI trigger DCI or data scheduling DCI, based on the payload size of the DCI.

For example, FIG. 6 shows a case where the payload size of data scheduling DCI is assumed as "X" and the payload size of CSI trigger DCI is assumed as "Y" (X>Y). Note that it may be configured that the size of the CSI trigger DCI is larger than the size of the data scheduling DCI.

In general, the payload size of each piece of DCI is determined according to the number of bits of the bit field included in the piece of DCI, but a case where the size of CSI trigger DCI and the size of data scheduling DCI are the same is also assumed. In this case, it may be configured that the pieces of DCI are different from each other in payload size by adding a certain bit to one of the pieces of DCI. The certain bit may be a padding bit of one bit corresponding to null information.

In a case of using a configuration that the size of CSI trigger DCI and the size of data scheduling DCI are different from each other, different error correcting codes (for example, polar codes) may be used for the respective pieces of DCI.

An RNTI to be used for a CRC mask for CSI trigger DCI and an RNTI to be used for a CRC mask for data scheduling DCI may be the same. In this way, it is possible to use the same RNTI for the pieces of DCI and to thereby suppress an increase in load of the transmitting/receiving processes.

It may be configured that one of a search space for CSI trigger DCI and a search space for data scheduling DCI includes the other. For example, it may be configured that the search space for the CSI trigger DCI is the same as the search space for the data scheduling DCI. It may be configured that the search space for the CSI trigger DCI is a subset or a superset of the search space for the data scheduling DCI.

By thus configuring that the CSI trigger DCI and the data scheduling DCI are different in size, it is possible to flexibly configure the size of each piece of DCI according to the use of the piece of DCI.

<Detection Conditions for DCI>

Detection conditions for CSI trigger DCI and data scheduling DCI are configured separately (for example, not to overlap). For example, it may be configured that the search space and/or aggregation level (AL) of the CSI trigger DCI and the search space and/or aggregation level of the data scheduling DCI are different from each other. In this case, the UE determines whether received DCI is CSI trigger DCI or data scheduling DCI, based on the detection conditions (or detection ranges) for the pieces of DCI.

For example, it is configured that the search space for the CSI trigger DCI and the search space for the data scheduling DCI do not overlap. As an example, the search space for the CSI trigger DCI is configured in a first control region (for example, a first control resource set region), and the search space for the data scheduling DCI is configured in a second control region (for example, a second control resource set region).

The UE monitors the first control region and the second control region and determines DCI detected in the first control region as CSI trigger DCI while determining DCI detected in the second control region as data scheduling DCI.

The number of PDCCH candidates for a search space for CSI trigger DCI configured in the first control region and the number of PDCCH candidates for a search space for data scheduling DCI configured in the second control region may be separately configurable. The number of PDCCH candidates may be the total number or the number for each AL.

In this way, it is possible to configure the numbers of search space candidates for the pieces of DCI, at different values, and to hence flexibly configure the pieces of DCI. By configuring the number of search space candidates for a certain piece of DCI (for example, CSI trigger DCI) to be small, it is possible to suppress an increase in the number of times of blind decoding by the UE even when search spaces are configured separately.

It may be configured that an AL to be used for PDCCH candidates for CSI trigger DCI and an AL to be used for PDCCH candidates for data scheduling DCI are different from each other. As an example, the AL of CSI trigger DCI is configured at a certain value or greater, and the AL of data scheduling DCI is configured at a value smaller than the certain value.

The UE determines DCI detected in certain AL or higher as CSI trigger DCI while determining DCI detected in AL lower than the certain AL as data scheduling DCI. In this case, it may be configured that the search space for the CSI trigger DCI and the search space for the data scheduling DCI are configured in the same control region or are configured in different control regions.

The DCI format size (payload size) of CSI trigger DCI and the DCI format size of data scheduling DCI may be the same or may be different values.

An RNTI to be used for a CRC mask for the CSI trigger DCI and an RNTI to be used for a CRC mask for the data scheduling DCI may be the same or different values.

By thus configuring that the detection conditions (for example, search spaces and/or aggregation levels, and the like) for CSI trigger DCI and data scheduling DCI to be different from each other, it is possible to flexibly configure a detection condition and the like for each of the pieces of DCI.

<Bit Value of Certain Field>

Figure 7:
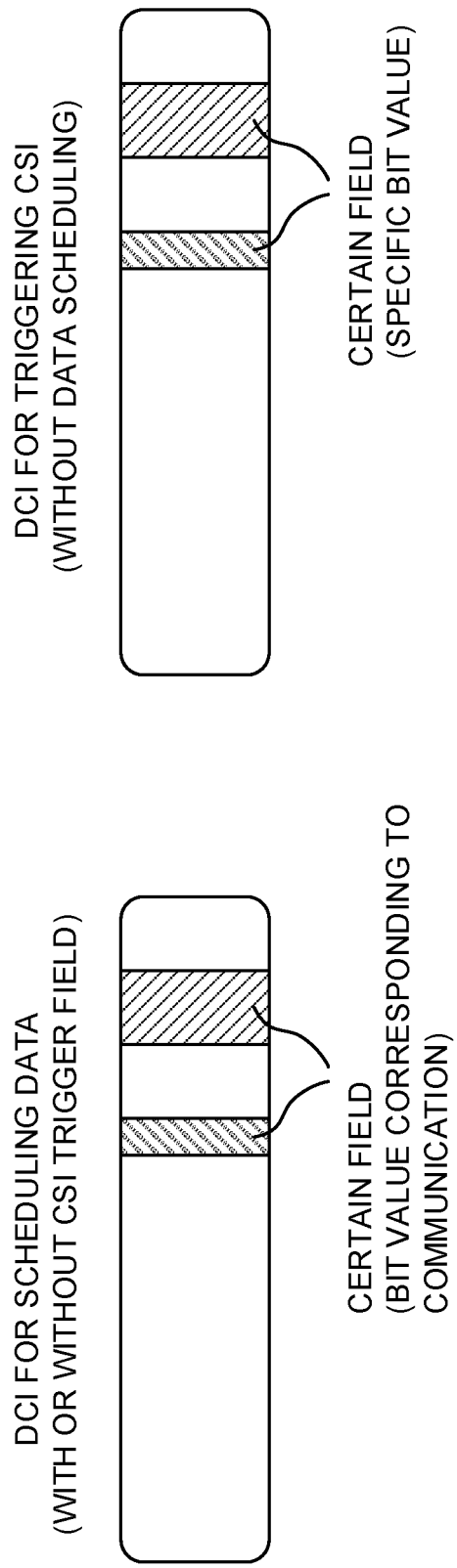
FIG. 7 is a diagram to show another example of CSI trigger DCI and data scheduling DCI.

A specific bit value (a specific bit value) is configured in a certain field included in CSI trigger DCI. The specific bit value may be a value not configured in a certain field included in data scheduling DCI (refer to FIG. 7). The UE determines whether received DCI is CSI trigger DCI or data scheduling DCI, based on a bit value in the certain field included in each piece of DCI (whether or not the bit value is the specific bit value).

The number of certain fields may be one, or two or more. When a plurality of certain fields are used, a combination of bit values of the plurality of certain fields only needs to be unique values (or specific bit values) not configured in a certain field included in the data scheduling DCI.

The certain field can use, for example, at least one of a modulation and coding scheme (MCS) index or code rate reporting field, an HARQ process number reporting field, an RV reporting field, and a DMRS sequence reporting field. For example, in the CSI trigger DCI, at least any of (1) to (4) below is configured:

(1) MCS index or code rate reporting field: the most significant bit (MSB) is '0,'
(2) HARQ process number reporting field: '000' or '0000,'
(3) RV reporting field: '00,' and
(4) DMRS sequence reporting field: '000.'

The DCI format size (payload size) of CSI trigger DCI and the DCI format size of data scheduling DCI may be the same or may be different values.

An RNTI to be used for a CRC mask for the CSI trigger DCI and an RNTI to be used for a CRC mask for the data scheduling DCI may be the same or different values.

It may be configured that one of a search space for CSI trigger DCI and a search space for data scheduling DCI includes the other. Alternatively, it may be configured that the search spaces and/or ALs for the CSI trigger DCI and the data scheduling DCI are different from each other.

By thus determining the type of DCI, based on a bit value of a certain field, it is possible to effectively use a bit value not used in a certain field included in CSI trigger DCI while flexibly configuring other conditions (payload sizes, detection conditions, and the like of the pieces of DCI).

(Third Aspect)

In a third aspect, a description will be given of a case where a UE selects a UL channel for performing CSI reporting, based on information included in CSI trigger DCI indicating a CSI trigger without scheduling data.

For example, the UE determines whether the UL channel for performing CSI reporting is a PUSCH or a PUSCH, based on bit information of a certain field included in CSI trigger DCI. Descriptions will be given below of a case of implicitly reporting and a case of explicitly reporting a UL channel for performing CSI reporting to the UE.

<Implicit Field Configuration>

Figure 8A:
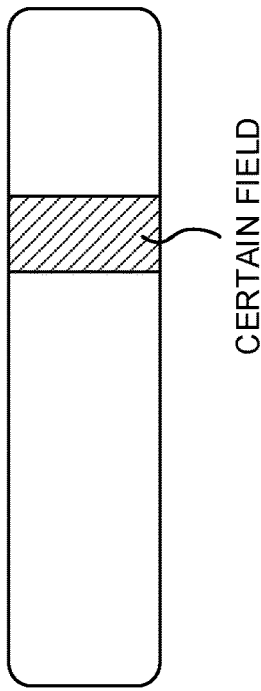
FIG. 8A and FIG. 8B are diagrams to show examples of CSI trigger DCI.

Different contents (for example, different conditions and/or the different numbers of bits, and the like) are configured for a certain field (also referred to as an "implicit field") included in CSI trigger DCI, for a case of using a PUSCH and a case of using a PUCCH for CSI reporting (refer to FIG. 8A). The certain field may be, for example, a resource allocation field (RA field) and/or a modulation and coding scheme field (MCS field).

In a case of triggering CSI reporting using a PUSCH, the base station may configure the size of the RA field in the CSI trigger DCI similarly to the RA field included in DCI for scheduling a PUSCH (for example, UL data) and report the size of the RA field to the UE. In this case, the size of the RA field can be determined based on the RA type (for example, RA type 0 or RA type 1) to be used for PUSCH allocation.

RA type 0 controls frequency resource allocation in a certain unit (for example, a unit of RBG) by using a bitmap. In other words, in RA type 0, a PUSCH allocation resource is indicated by a bitmap for each RBG constituted of one or more RBs. In RA type 1, a PUSCH allocation resource is indicated by a resource indication value (RIV) corresponding to a start resource block ($RB_{START}$) and the number of resource blocks allocated contiguously (transmission bandwidth) ($L_{CRBs}$, $L_{CRBs} \geq 1$). The RIV is calculated based on the number of resource blocks constituting an uplink band ($N^{UL}_{RB}$), the above-described $RB_{START}$, and the above-described $L_{CRBs}$, and is mapped to a resource allocation field of downlink control information (DCI).

As described above, in a case of triggering CSI reporting using a PUSCH, a PUSCH to which A-CSI is allocated is scheduled based on the RA field included in the CSI trigger DCI.

In a case of triggering CSI reporting using a PUCCH, it may be configured that the content and/or size (for example, the number of bits) of the certain field is different from the content and/or the size in a case of using a PUSCH. The UE can determine a UL channel to be used for transmission of CSI, based on the RA field and/or the MCS field.

The format size (payload size) of the CSI trigger DCI may be configured to be the same in a case of triggering CSI reporting using a PUCCH and a case of triggering CSI reporting using a PUSCH.

For example, the size of a certain field (an RA field and/or an MCS field) included in CSI trigger DCI may be configured to be the same in a case of triggering CSI reporting using a PUSCH and a case of triggering CSI reporting using a PUCCH. In this case, pieces of bit information in the certain field only need to be configured at different values. For example, specific bit information may be used in a case of triggering CSI reporting using a PUCCH.

Figure 8B:
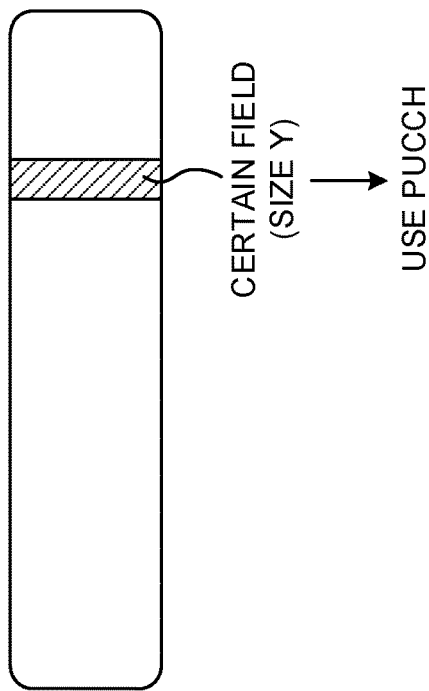
Figure 8B:
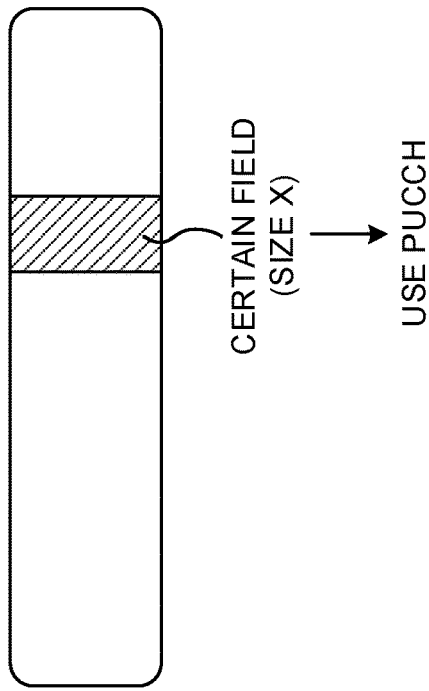

Alternatively, the size of a certain field (an RA field and/or an MCS field) included in CSI trigger DCI may be configured to be different between a case of triggering CSI reporting using a PUSCH and a case of triggering CSI reporting using a PUCCH (refer to FIG. 8B). FIG. 8B shows a case assuming that the size of the certain field is X in a case of triggering CSI reporting using a PUSCH and the size of the certain field is Y in a case of triggering CSI reporting using a PUCCH (X>Y).

The number of resources (for example, the number of PRBs) usable for PUCCH transmission is assumed to be smaller (or more restricted) than the number of PRBs usable for PUSCH transmission. Hence, a PUCCH resource can be configured without any problem even when the size of the certain field (for example, the RA field) in a case of triggering CSI reporting using a PUCCH is smaller than that of a case of triggering CSI reporting using a PUSCH.

In a case of configuring the size of the certain field size in a case of triggering CSI reporting using a PUCCH, to be smaller than that in a case of using a PUSCH, remaining bits may be used as reserved bits or may be used for other purposes. The remaining bits may be used as a bit field for reporting a PUCCH format (for example, indication of whether a long PUCCH or a short PUCCH). By thus changing the number of bits of the certain field according to the type of UL channel, the bits of CSI trigger DCI can be efficiently used.

When the UE receives DCI, the UE determines whether the DCI is CSI trigger DCI or data scheduling DCI (for example, by employing the above-described second aspect). In a case of determining that the received DCI is CSI trigger DCI, the UE may determine whether a UL channel for performing CSI reporting is a PUSCH or a PUCCH, based on the certain field (by employing the third aspect) and control the CSI reporting.

<Explicit Field Configuration>

Figure 9:
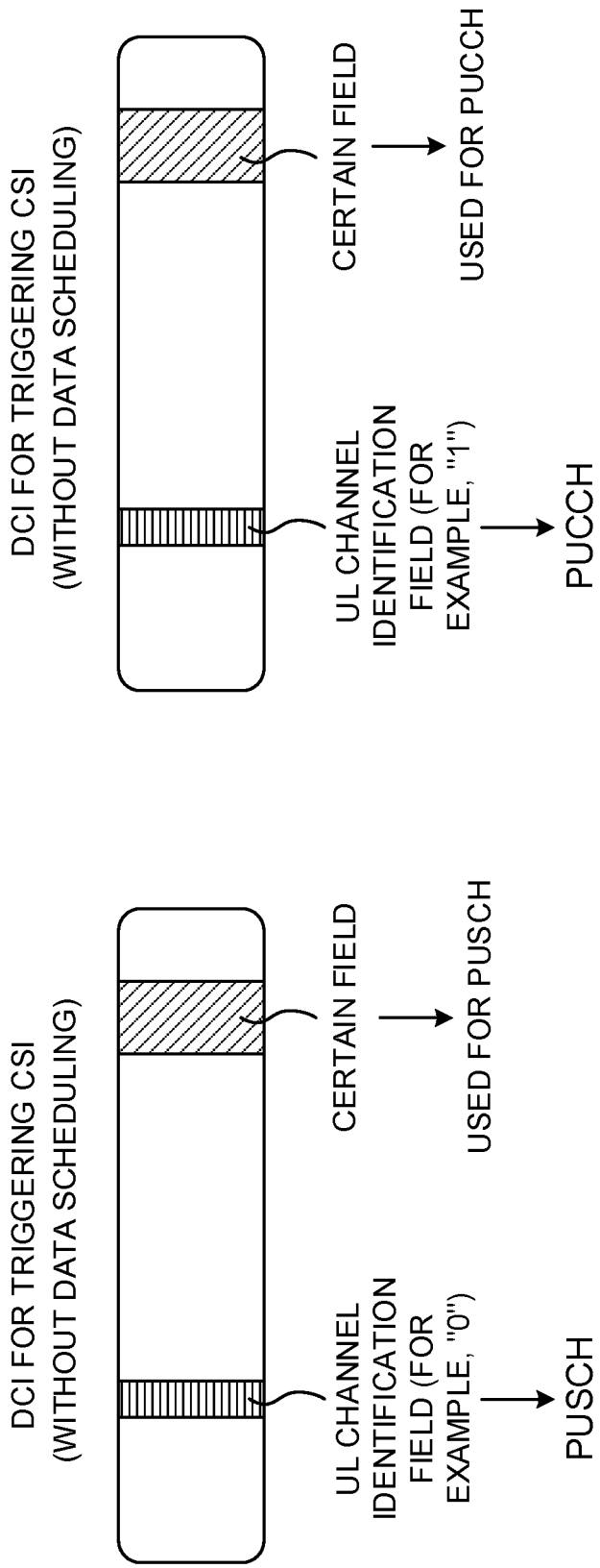
FIG. 9 is a diagram to show another example of CSI trigger DCI.

In CSI trigger DCI, a field for identifying a UL channel to be used for CSI reporting (UL channel identification field) is provided (refer to FIG. 9). The UE determines whether the UL channel for performing CSI reporting is a PUSCH or a PUCCH, based on bit information of the UL channel identification field included in the CSI trigger DCI.

For example, in FIG. 9, the UL channel identification field is configured using one bit, and CSI reporting using a PUSCH is performed when the bit value of the identification field is "0," while CSI reporting using a PUCCH is performed when the bit value is "1." Note that the UL channel identification field is not limited to one bit and may be provided using two or more bits.

When the UE receives DCI, the UE determines whether the DCI is CSI trigger DCI or data scheduling DCI (for example, by employing the above-described second aspect). In a case of determining that the received DCI is CSI trigger DCI, the UE may determine whether the UL channel for performing CSI reporting is a PUSCH or a PUCCH, based on the UL channel identification field (by employing the third aspect) and control the CSI reporting.

The UE controls interpretation of other bit fields (certain fields), based on bit information of the UL channel identification field included in the CSI trigger DCI. For example, in a case that the UL channel identification field indicates a PUSCH, the UE uses information reported in the power control command (TPC) field for PUSCH transmission. In a case that the UL channel identification field indicates a PUCCH, in contrast, the UE uses information reported in the power control command (TPC) field for PUCCH transmission.

In a case that the UL channel identification field indicates a PUSCH, the UE uses information reported in the RA field for PUSCH transmission. In a case that the UL channel identification field indicates a PUCCH, in contrast, the UE uses information reported in the RA field for PUCCH transmission. By thus controlling interpretation of other bit fields, based on the UL channel identification field, it is possible to have bit fields in common in a case of using a PUSCH and a case of using a PUCCH for CSI reporting.

(Fourth Aspect)

In a fourth aspect, different RNTIs are used between CSI trigger DCI that indicates a CSI trigger without scheduling data and DCI for scheduling data.

For example, masking is performed on a CRC of CSI trigger DCI by using a first RNTI (for example, a specific RNTI), and masking is performed on a CRC of data scheduling DCI by using a second RNTI. Information related to the first RNTI used for the CSI trigger DCI may be configured by the base station in the UE by higher layer signaling (for example, RRC signaling or the like).

In a case of using different RNTIs for the CSI trigger DCI and the data scheduling DCI, the search space for CSI trigger DCI and the search space for data scheduling DCI may be configured to be different from each other (for example, configured not to overlap). In this case, the search spaces compete for resources to which these two can be assigned, and this can reduce the blocking probability that allocation of either of the two fails.

Alternatively, in a case of using different RNTIs for the CSI trigger DCI and the data scheduling DCI, the search space for the CSI trigger DCI and the search space for the data scheduling DCI may be configured to be the same (or configured that one includes the other). In this case, since results of channel estimation and error correction decoding performed in single blind detection can be used for blind detection for a plurality of pieces of DCI, processing load of terminals can be reduced.

(Radio Communication System)

Hereinafter, a structure of a radio communication system according to one embodiment of the present invention will be described. In this radio communication system, the radio communication method according to each embodiment of the present invention described above may be used alone or may be used in combination for communication.

Figure 10:
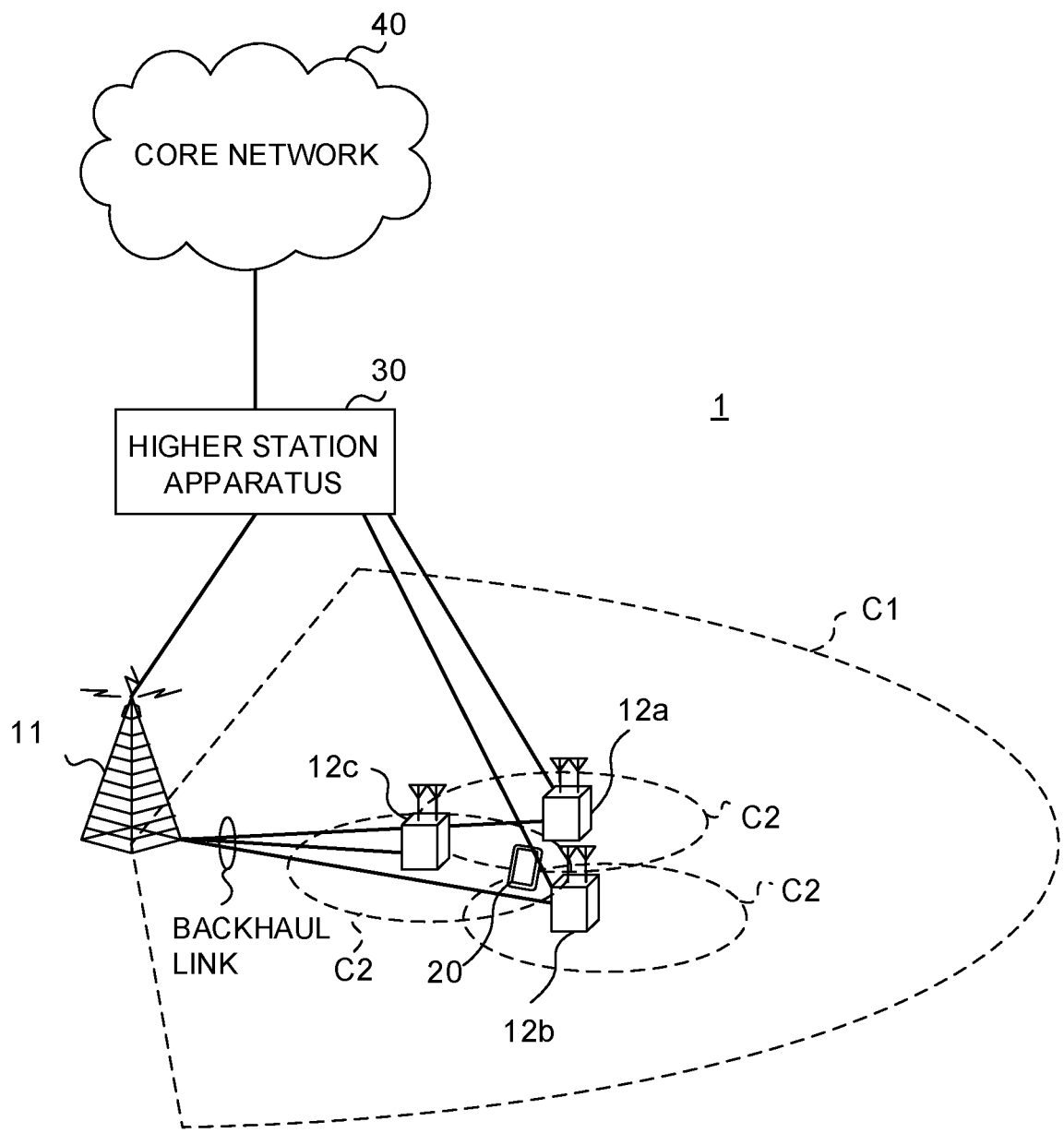
FIG. 10 is a diagram to show an example of a schematic structure of a radio communication system according to one embodiment of the present invention.

FIG. 10 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," "NR (New Radio)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement of each cell and user terminal 20 are by no means limited to that shown in the diagram.

The user terminals 20 can connect with both the radio base station 11 and the radio base stations 12. It is assumed that the user terminals 20 use the macro cell C1 and the small cells C2 at the same time by CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME), and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands constituted of one or contiguous resource blocks per terminal, and allowing a plurality of terminals to use mutually different bands. Note that the uplink and downlink radio access schemes are by no means limited to the combinations of these, and other radio access schemes may be used.

It may be configured, in the radio communication system 1, that different numerologies are used in a cell and/or among cells. Note that numerology means, for example, a communication parameter (for example, a subcarrier spacing, a bandwidth, and so on) used for transmission/reception of a certain signal.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks), are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and PUSCH scheduling information, and so on are communicated on the PDCCH. The number of OFDM symbols to be used for the PDCCH is communicated on the PCFICH. Acknowledge information (for example, also referred to as "retransmission control information," "HARQ-ACK," "ACK/NACK," and so on) of HARQ (Hybrid Automatic Repeat reQuest) for a PUSCH is communicated on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information, and so on are communicated on the PUSCH. In addition, radio quality information (CQI (Channel Quality Indicator)) of the downlink, acknowledge information, and so on are communicated on the PUCCH. Random access preambles for establishing connections with cells are communicated on the PRACH.

In the radio communication system 1, a cell-specific reference signal (CRS), a channel state information-reference signal (CSI-RS), a demodulation reference signal (DMRS), a positioning reference signal (PRS), and so on are communicated as downlink reference signals. In the radio communication system 1, a measurement reference signal (SRS (Sounding Reference Signal)), a demodulation reference signal (DMRS), and so on are communicated as uplink reference signals. Note that DMRS may be referred to as a "user terminal specific reference signal (UE-specific Reference Signal)." Communicated reference signals are by no means limited to these.

(Radio Base Station)

Figure 11:
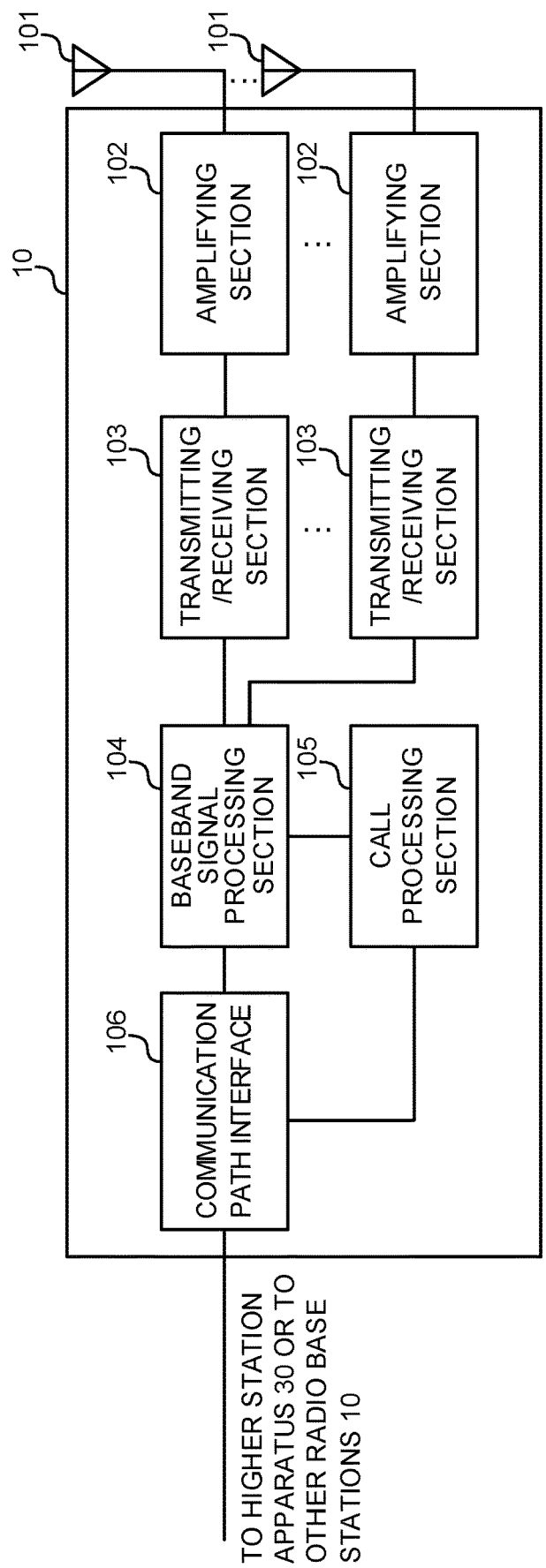
FIG. 11 is a diagram to show an example of an overall structure of a radio base station according to one embodiment of the present invention.

FIG. 11 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

The transmitting/receiving sections 103 transmit certain downlink control information indicating trigger and/or activation of channel state information without scheduling data. The transmitting/receiving sections 103 also receive channel state information transmitted from the UE.

Figure 12:
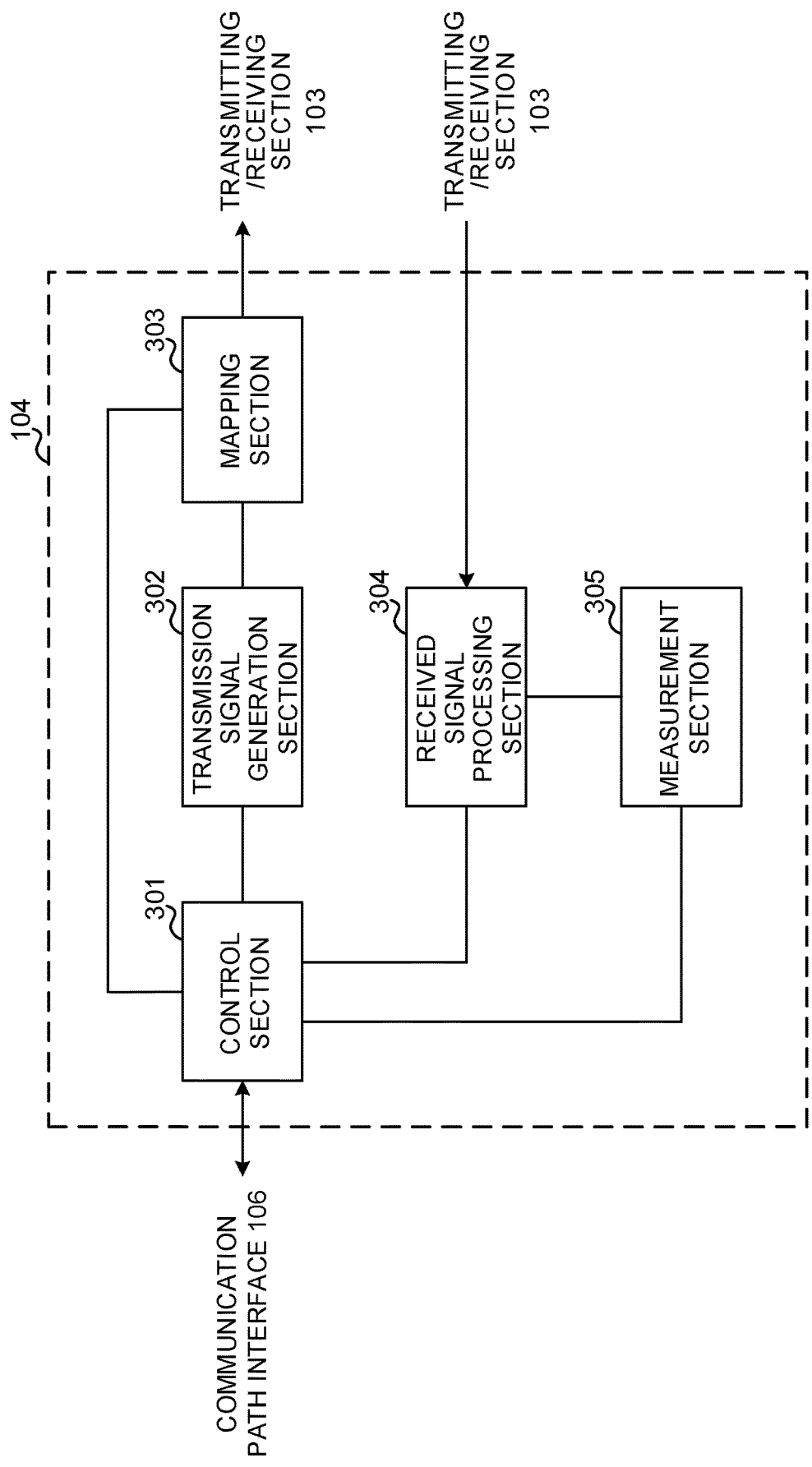
FIG. 12 is a diagram to show an example of a functional structure of the radio base station according to one embodiment of the present invention.

FIG. 12 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals by the transmission signal generation section 302, the mapping of signals by the mapping section 303, and so on. The control section 301 controls the signal receiving processes by the received signal processing section 304, the measurements of signals by the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH, an EPDCCH, or a NR-PDCCH). Based on the results of determining whether or not retransmission control to the uplink data signal is necessary, or the like, the control section 301 controls generation of a downlink control signal (for example, acknowledge information), a downlink data signal, and so on. The control section 301 controls the scheduling of a synchronization signal (for example, a PSS (Primary Synchronization Signal)/an SSS (Secondary Synchronization Signal)), a downlink reference signal (for example, a CRS, a CSI-RS, a DMRS), and so on.

The control section 301 controls scheduling of an uplink data signal (for example, a signal transmitted on a PUSCH), an uplink control signal (for example, a signal transmitted on a PUCCH and/or a PUSCH), a random access preamble transmitted on a PRACH, an uplink reference signal, and so on.

The control section 301 controls generation and transmission of certain downlink control information (CSI trigger DCI) indicating trigger and/or activation of channel state information without scheduling data. For example, the control section 301 performs control to include, in DCI, a bit field for identifying CSI trigger DCI or data scheduling DCI.

The control section 301 may perform control so that CSI trigger DCI and data scheduling DCI are different from each other in at least one of size, search space, and aggregation level to be used (the second aspect). The control section 301 may perform control to include, in CSI trigger DCI, information for specifying a UL channel to be used for CSI reporting (the third aspect). The control section 301 may perform control to use different RNTIs for CSI trigger DCI and data scheduling DCI (the fourth aspect).

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

The transmission signal generation section 302 generates, for example, DL assignment to report assignment information of a downlink signal and a UL grant to report assignment information of an uplink signal, based on commands from the control section 301. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to the above-described certain radio resources, based on commands from the control section 301, and outputs these to the transmitting/receiving sections 103. The mapping section 303 can be constituted with a mapper, a mapping circuit, or mapping apparatus that can be described based on general understanding of the technical field to which the present invention pertains.

The received signal processing section 304 performs receiving processes (for example, demapping, demodulation, decoding, and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

The measurement section 305 may measure, for example, a received power (for example, RSRP (Reference Signal Received Power)), a received quality (for example, RSRQ (Reference Signal Received Quality), an SINR (Signal to Interference plus Noise Ratio), uplink channel information (for example, CSI), and so on of a received signal. The measurement results may be output to the control section 301.

(User Terminal)

Figure 13:
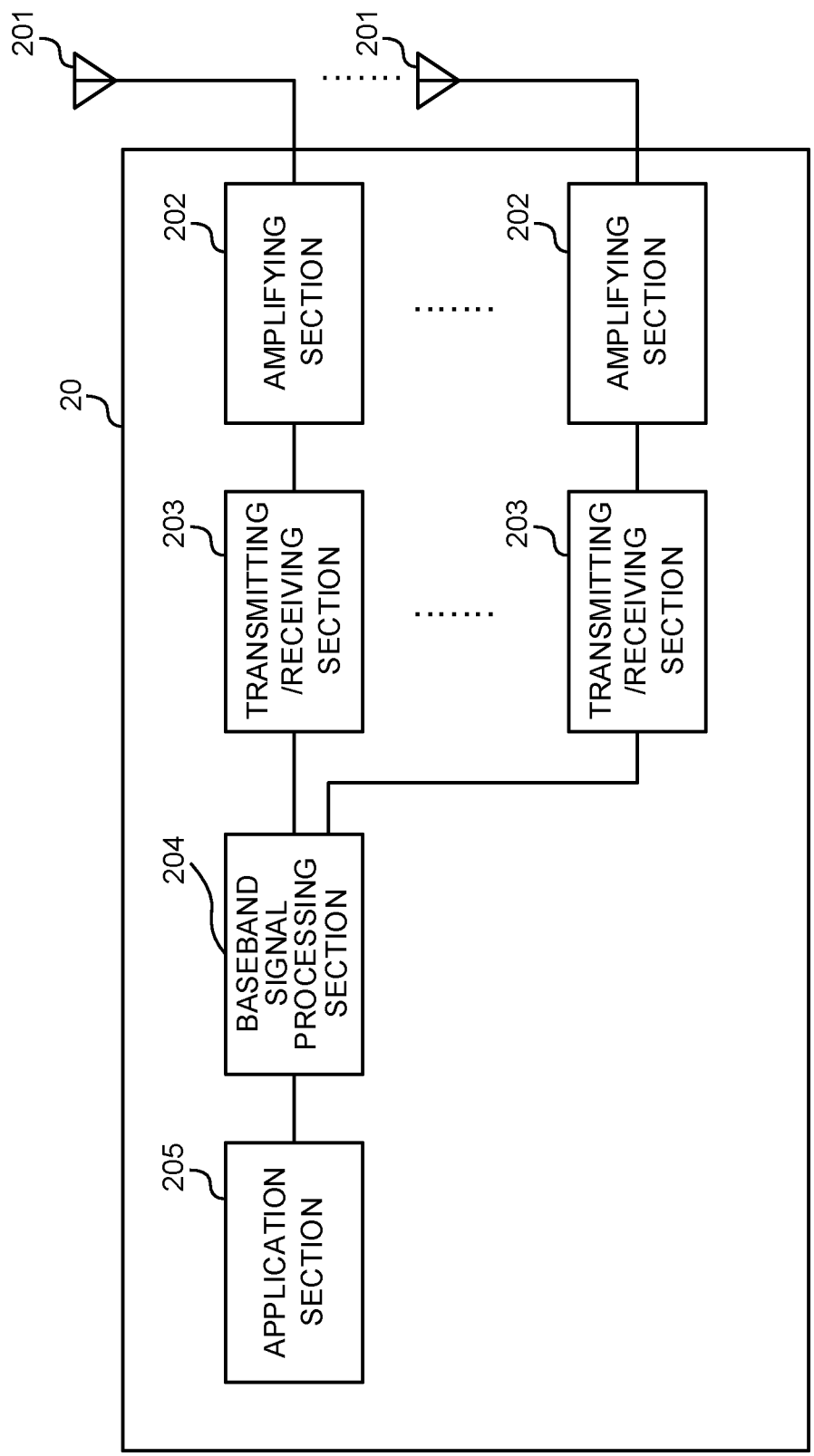
FIG. 13 is a diagram to show an example of an overall structure of a user terminal according to one embodiment of the present invention.

FIG. 13 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits, or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 transmit channel state information on a PUSCH and/or a PUCCH. The transmitting/receiving sections 203 also receive certain downlink control information indicating trigger and/or activation of channel state information without scheduling data.

Figure 14:
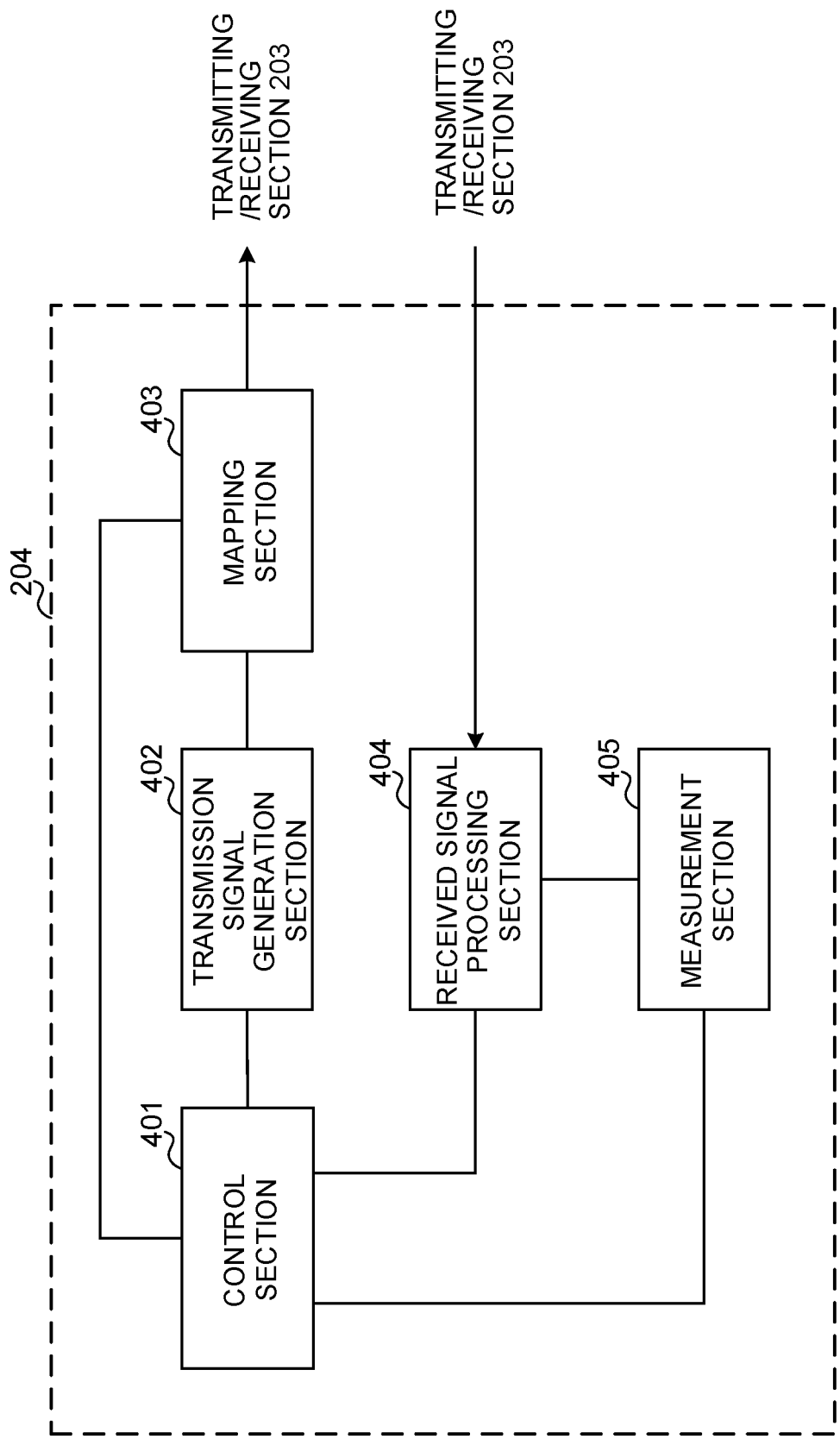
FIG. 14 is a diagram to show an example of a functional structure of the user terminal according to one embodiment of the present invention.

FIG. 14 is a diagram to show an example of a functional structure of a user terminal according to one embodiment of the present invention. Note that, the present example primarily shows functional blocks that pertain to characteristic parts of the present embodiment, and it is assumed that the user terminal 20 includes other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit, or control apparatus that can be described based on general understanding of the technical field to which the present invention pertains.

The control section 401, for example, controls the generation of signals by the transmission signal generation section 402, the mapping of signals by the mapping section 403, and so on. The control section 401 controls the signal receiving processes by the received signal processing section 404, the measurements of signals by the measurement section 405, and so on.

The control section 401 acquires, from the received signal processing section 404, a downlink control signal (for example, a signal transmitted on a NR-PDCCH) and a downlink data signal (for example, a signal transmitted on a PDSCH) transmitted from the radio base station 10. The control section 401 controls generation of an uplink control signal (for example, acknowledge information or the like) and/or an uplink data signal, based on the results of determining whether or not retransmission control for a downlink control signal and/or a downlink data signal is necessary.

The control section 401 controls transmission of channel state information by using certain downlink control information (CSI trigger DCI) indicating trigger and/or activation of the channel state information without scheduling data.

The control section 401 may control receiving processes by assuming that a bit field for identifying CSI trigger DCI or data scheduling DCI is included in each DCI. Alternatively, the control section 401 may control receiving processes by assuming that CSI trigger DCI and data scheduling DCI are different from each other in at least one of size, search space, and aggregation level to be used (the second aspect).

The control section 401 may control receiving processes by assuming that information for specifying a UL channel to be used for CSI reporting is included in CSI trigger DCI (the third aspect). The control section 401 may control receiving processes by assuming that different RNTIs are used for CSI trigger DCI and data scheduling DCI (the fourth aspect).

The transmission signal generation section 402 generates uplink signals (uplink control signals, uplink data signals, uplink reference signals, and so on) based on commands from the control section 401, and outputs the uplink signals to the mapping section 403. The transmission signal generation section 402 can be constituted with a signal generator, a signal generation circuit, or signal generation apparatus that can be described based on general understanding of the technical field to which the present invention pertains.

For example, the transmission signal generation section 402 generates an uplink control signal about acknowledge information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit, or mapping apparatus that can be described based on general understanding of the technical field to which the present invention pertains.

The received signal processing section 404 performs receiving processes (for example, demapping, demodulation, decoding, and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit, or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI, and so on, to the control section 401. The received signal processing section 404 outputs the received signals and/or the signals after the receiving processes to the measurement section 405.

The measurement section 405 conducts measurements with respect to the received signals. For example, the measurement section 405 conducts measurements by using a downlink reference signal transmitted from the radio base station 10. The measurement section 405 can be constituted with a measurer, a measurement circuit, or measurement apparatus that can be described based on general understanding of the technical field to which the present invention pertains.

The measurement section 405 may measure, for example, a received power (for example, RSRP), a received quality (for example, RSRQ, and received SINR), downlink channel information (for example, CSI), and so on of a received signal. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and by these plurality of pieces of apparatus.

Figure 15:
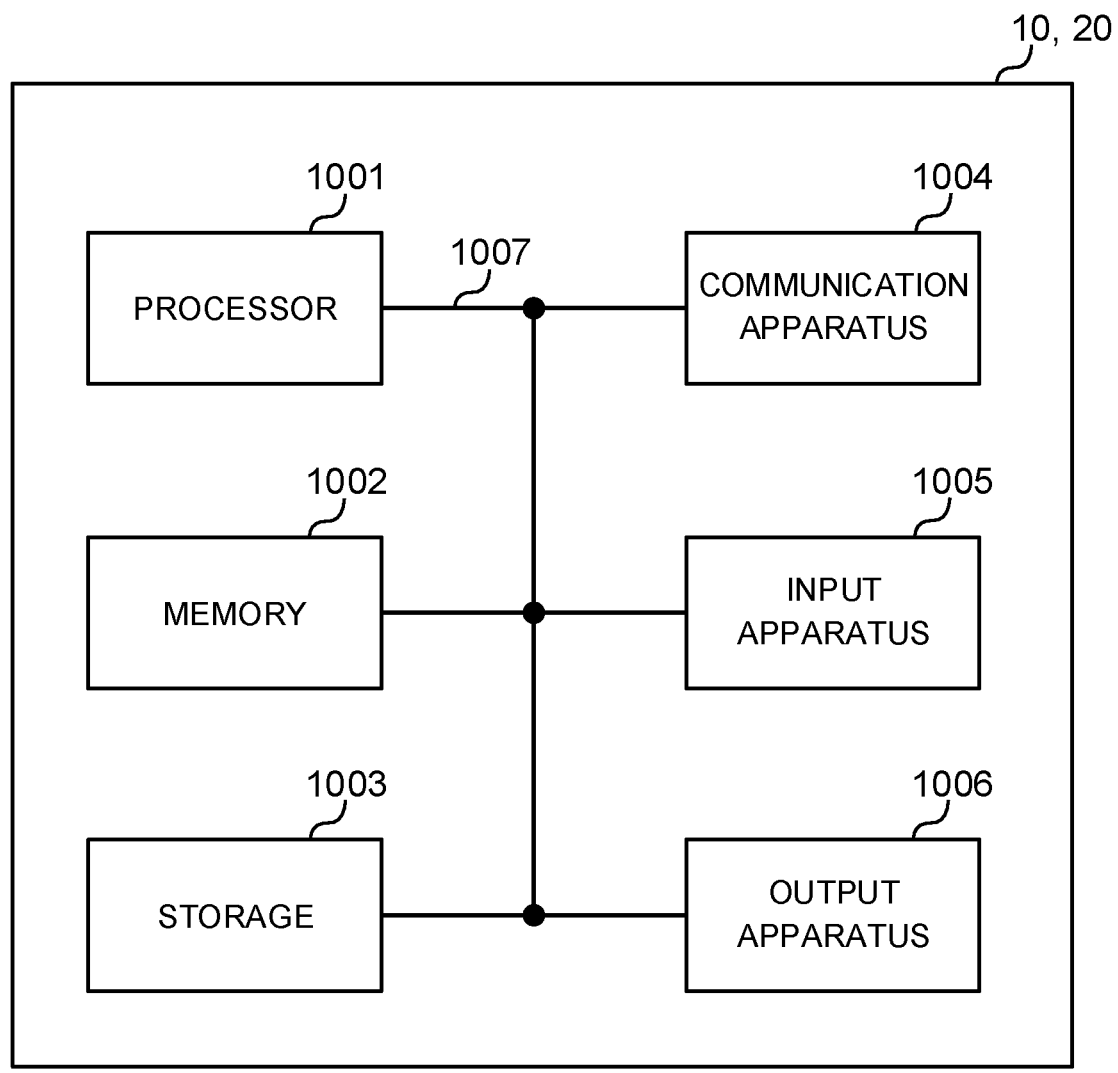
FIG. 15 is a diagram to show an example of a hardware structure of the radio base station and the user terminal according to one embodiment of the present invention.

For example, a radio base station, a user terminal, and so on according to one embodiment of the present invention may function as a computer that executes the processes of the radio communication method of the present invention. FIG. 15 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication by the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be those indicated by certain indices. Moreover, mathematical expressions and the like using these parameters may be different from those explicitly disclosed in this specification.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed in a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification and may be performed in other methods. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be performed explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification can be used interchangeably.

In this specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In this specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Specific actions which have been described in this specification to be performed by a base station may, in some cases, be performed by upper nodes. In a network constituted of one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access." Two elements, in a case of being used in this specification, may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
a receiver that receives downlink control information (DCI); and
a processor that determines, based on a field included in the DCI, whether the DCI is a first DCI that indicates transmission of an uplink data using uplink shared channel, or is a second DCI that indicates at least one of triggering and activation of channel state information reporting, using the uplink shared channel without transmission of the uplink data,
wherein regardless of whether the processor determines that the DCI is the first DCI or determines that the DCI is the second DCI, a same RNTI is used in a CRC mask of the DCI,
wherein a search space for the first DCI and a search space for the second DCI are set to be same, and
wherein the processor performs the transmission of the uplink data when the field is a first value, and performs a transmission of the channel state information without performing the transmission of the uplink data when the field is a second value.

2. The terminal according to claim 1, wherein the processor controls the transmission of the channel state information, using the uplink shared channel, based on another field included in the DCI.

3. The terminal according to claim 1, wherein when the processor determines that the DCI is the second DCI, the processor determines whether to activate or deactivate the channel state information based on a plurality of fields included in the DCI.

4. The terminal according to claim 3, wherein the plurality of fields comprises an HARQ process number reporting field and an RV reporting field.

5. The terminal according to claim 4, wherein if an aperiodic channel state information reporting is triggered by the first DCI, a RNTI that is used in a CRC mask of the first DCI is different from a RNTI that is used in a CRC mask of the second DCI.

6. The terminal according to claim 3, wherein if an aperiodic channel state information reporting is triggered by the first DCI, a RNTI that is used in a CRC mask of the first DCI is different from a RNTI that is used in a CRC mask of the second DCI.

7. A radio communication method for a terminal, comprising:
receiving downlink control information (DCI); and
determining, based on a field included in the DCI, whether the DCI is a first DCI that indicates transmission of an uplink data using uplink shared channel, or is a second DCI that indicates at least one of triggering and activation of channel state information reporting, using the uplink shared channel without transmission of the uplink data,
wherein regardless of whether the terminal determines that the DCI is the first DCI or determines that the DCI is the second DCI, a same RNTI is used in a CRC mask of the DCI,
wherein a search space for the first DCI and a search space for the second DCI are set to be same, and
wherein the terminal performs the transmission of the uplink data when the field is a first value, and performs a transmission of the channel state information without performing the transmission of the uplink data when the field is a second value.

8. A base station comprising:
a processor that controls to include a field in downlink control information (DCI) to determine whether the DCI is a first DCI that indicates transmission of an uplink data using uplink shared channel, or is a second DCI that indicates at least one of triggering and activation of channel state information reporting, using the uplink shared channel without transmission of the uplink data; and
a transmitter that transmits the DCI,
wherein regardless of whether the processor determines that the DCI is the first DCI or determines that the DCI is the second DCI, a same RNTI is used in a CRC mask of the DCI,
wherein a search space for the first DCI and a search space for the second DCI are set to be same, and
wherein the processor controls to perform the transmission of the uplink data when the field is a first value, and perform a transmission of the channel state information without performing the transmission of the uplink data when the field is a second value.

9. A system comprising a terminal and a base station, wherein
the terminal comprises:
a receiver that receives downlink control information (DCI); and
a processor of the terminal that determines, based on a field included in the DCI, whether the DCI is a first DCI that indicates transmission of an uplink data using uplink shared channel, or is a second DCI that indicates at least one of triggering and activation of channel state information reporting, using the uplink shared channel without transmission of the uplink data,
wherein regardless of whether the processor determines that the DCI is the first DCI or determines that the DCI is the second DCI, a same RNTI is used in a CRC mask of the DCI,
wherein a search space for the first DCI and a search space for the second DCI are set to be same, and
wherein the processor of the terminal performs the transmission of the uplink data when the field is a first value, and performs a transmission of the channel state information without performing the transmission of the uplink data when the field is a second value, and
the base station comprises:
a processor of the base station that controls to include the field in the DCI to determine whether the DCI is the first DCI or the second DCI; and
a transmitter that transmits the DCI.

* * * * *